US006857053B2

(12) United States Patent
Bolik et al.

(10) Patent No.: US 6,857,053 B2
(45) Date of Patent: Feb. 15, 2005

(54) METHOD, SYSTEM, AND PROGRAM FOR BACKING UP OBJECTS BY CREATING GROUPS OF OBJECTS

(75) Inventors: Christian Bolik, Mainz (DE); David Maxwell Cannon, Tucson, AZ (US); Colin Scott Dawson, Tucson, AZ (US); Avishai Haim Hochberg, San Jose, CA (US); Michael Allen Kaczmarski, Tucson, AZ (US); James Patrick Smith, Redwood City, CA (US); Christopher Zaremba, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 10/120,015

(22) Filed: Apr. 10, 2002

(65) Prior Publication Data

US 2003/0196052 A1 Oct. 16, 2003

(51) Int. Cl.⁷ .............................................. G06F 12/00
(52) U.S. Cl. ...................................... 711/162; 707/204
(58) Field of Search ............................. 711/161, 162, 711/165; 707/204, 202; 714/6, 15, 16

(56) References Cited

U.S. PATENT DOCUMENTS

| 5,907,672 | A | * | 5/1999 | Matze et al. ................... 714/8 |
| 5,974,563 | A | * | 10/1999 | Beeler, Jr. ....................... 714/5 |
| 6,006,234 | A | * | 12/1999 | Govindarajan et al. . 707/103 R |
| 6,038,677 | A | | 3/2000 | Lawlor et al. |
| 6,138,152 | A | | 10/2000 | Jalote et al. |
| 6,182,080 | B1 | | 1/2001 | Clements |
| 6,225,998 | B1 | | 5/2001 | Okita et al. |
| 6,266,679 | B1 | * | 7/2001 | Szalwinski et al. ......... 707/204 |
| 6,279,028 | B1 | | 8/2001 | Bradshaw, Jr. et al. |
| 6,282,570 | B1 | | 8/2001 | Leung et al. |
| 6,295,527 | B1 | | 9/2001 | McCormack et al. |
| 6,301,557 | B1 | | 10/2001 | Miller et al. |
| 6,317,748 | B1 | | 11/2001 | Menzies |
| 6,490,610 | B1 | * | 12/2002 | Rizvi et al. .................. 718/101 |
| 6,519,614 | B1 | * | 2/2003 | Kanai et al. ................. 707/202 |
| 6,625,591 | B1 | * | 9/2003 | Vahalia et al. .................. 707/1 |

FOREIGN PATENT DOCUMENTS

| JP | 11110391 | 4/1999 |
| WO | 0116727 | 3/2001 |

OTHER PUBLICATIONS

U.S. patent application Publication No. US 2001/0037412 A1, published Nov. 1, 2001, inventors Miloushev et al., entitled "Method and System for Constructing Software Components and Systems as Assemblies of Independent Parts", drawing sheets 1–55, pp. 1–38.

H.A. Inniss, et al., "Recursive Composition Objects", IBM Technical Disclosure Bulletin, vol. 34, No. 11, Apr. 1992, pp. 293–294.

R. E. Berry, et al., "Tagging Objects to Form an Arbitrary Group", IBM Technical Disclosure Bulletin, vol. 40, No. 5, May 1997, pp. 115–116.

R. Leins, et al., "Tivoli Storage Manager Version 3.7.3 & 4.1: Technical Guide", IBM Technical Support Organization, Document No. SG24–6110–00, Sep. 2000, Chapter 3, pp. 81–110, Chapter 6, pp. 195–200.

* cited by examiner

*Primary Examiner*—Matthew Kim
*Assistant Examiner*—Hetul Patel
(74) *Attorney, Agent, or Firm*—David W. Victor; Konrad Raynes & Victor LLP (57) ABSTRACT

Provided are a system, method, and program for grouping backup objects stored in backup storage. A backup group is created and a plurality of backup objects are added as members of the backup group in separate backup transactions. The backup objects added to the backup group are stored to backup storage.

27 Claims, 9 Drawing Sheets

Backup Object Entry

FIG. 2b

Group Members Entry

METHOD, SYSTEM, AND PROGRAM FOR BACKING UP OBJECTS BY CREATING GROUPS OF OBJECTS

BACKGROUND OF THE INVENTION

1. Field of the Invention

The present invention relates to a method, system, and program for grouping objects.

2. Description of the Related Art

A backup program, such as the International Business Machines Corporation (IBM®) Tivoli® Storage Manager backup program,** maintains an image of the data and programs on systems in a network on a backup storage, such as on tape cartridges. In the event of a system failure or other event that results in a loss of data on the network systems, the backup program may be used to restore the data and programs from the tape cartridges.

Tivoli and Tivoli Storage Manager are trademarks of International Business Machines Corporation.

In the prior art, the backup client program may define a backup group as specific objects to backup, such as data files, database files, programs, etc. A backup group is a collection of distinct objects, which are managed as a single logical entity to maintain referential consistency in the event that these objects are restored. The objects are grouped because they are related to each other in a meaningful way, such as a set of files that together make up a software application, e.g., a database. Once the backup operation starts, the backup program processes all the received objects specified in the group, writes the received objects to a backup storage medium, and then confirms that the backup of the objects succeeded. If the backup of all objects succeeded, then the backup program will commit the backup. However, if one of the backup objects failed to properly backup, then the entire backup operation would fail, even if the vast majority of the objects successfully backed up. Once the backup has completed, the backup group cannot be modified or altered. Instead, the backup client program would have to create another group, which may be defined with the same objects as in the first group, and then run another backup operation for that new group, which would be maintained separately from the previous backup version.

In the prior art, if files are grouped, then an incremental backup cannot be performed for those data objects in the group that have changed. Instead, the administrator can only schedule full backups of grouped objects to ensure data consistency. Thus, grouped objects can only be backed-up in a single operation. Still further, in prior art backup systems, all the backup objects must originate from the same source system and must be backed up in the same system thread, i.e., only one backup per client per session. Still further, in the prior art, a group cannot be a member of another group, such that groups cannot be nested within one another.

For these reasons, there is a need in the art for improved techniques for grouping objects for use by applications, such as backup programs, that group backup objects.

SUMMARY OF THE PREFERRED EMBODIMENTS

Provided are a system, method, and program for grouping backup objects stored in backup storage. A backup group is created and a plurality of backup objects are added as members of the backup group in separate backup transactions. The backup objects added to the backup group are stored to backup storage.

Further, the backup objects sent in the separate backup transactions may originate from different backup clients.

In still further implementations, adding the backup objects to the backup group comprises adding an entry to a database for each backup object, wherein the entry identifies the backup object and the backup group in which the backup object is a member.

Further provided are a system, method and program for grouping backup objects stored in backup storage. A plurality of backup groups are created and backup objects are added to the backup groups. Backup objects are associated as members of at least one of the backup groups, wherein at least one backup object is associated with a plurality of the backup groups.

Still further, backup objects are stored in backup storage when adding the backup objects to one backup group. In such case, the backup group may comprise a first backup group and one backup object previously added to the first backup group is added to a second group. Additionally, the backup object is not stored in the backup storage when adding the backup object to the second backup group.

In further implementations, one entry is included in the backup database for each backup object and backup group providing an identifier of the backup object or backup group represented by the entry. The backup object entries indicate the identifier of the backup group of which the backup object is a member.

Yet further, a request may be received to remove one specified backup object from one specified backup group. In response, the entry for the specified backup object is updated to remove the indication of the specified backup group.

Further provided is a method, system, and program for committing data to a database. A plurality of transactions are received to add objects to a group, wherein the objects that are members of a group are associated together in the database. A determination is made as to whether the transactions successfully completed, wherein the object is committed if the transaction successfully completed. Failure is returned to those transactions that do not successfully complete, wherein after the transactions, the group comprises those objects added in transactions that successfully completed.

Still further provided are a method, system, and program for grouping backup objects stored in backup storage. A plurality of backup groups are created and backup objects are added to the backup groups. Backup objects are associated as members of at least one of the backup groups, wherein at least one backup object is associated with a first backup group that is a member of a second backup group.

Described implementations provide techniques to allow backup objects to be associated with different backup groups in a flexible manner such that backup objects can be added as members to multiple backup groups and backup objects can be added to or removed from backup groups across backup transactions.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
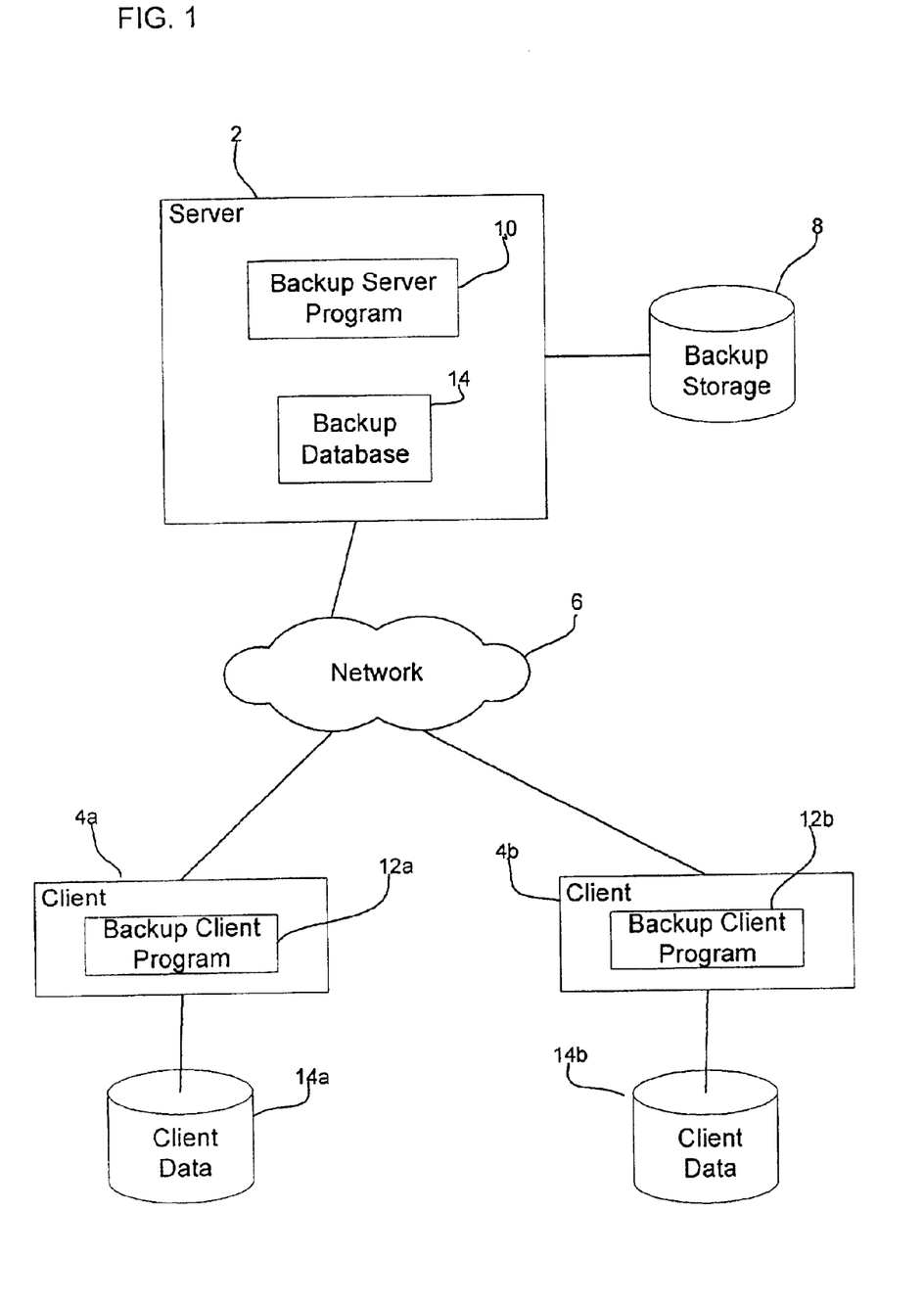
FIG. 1 illustrates a computing environment in which described implementations are realized.

FIG. 1 illustrates a computing environment in which described implementations may be realized. A server 2 is in communication with multiple client computers 4a, 4b over a network 6. The network 6 may comprise any network known in the art, such as the Internet, an Intranet, Storage Area Network (SAN), Local Area Network (LAN), Wide Area Network (WAN), etc., using any network protocol known in the art. The server 2 maintains a backup storage 8 to store backup data from the clients 4a, 4b. The backup storage 8 may comprise any non-volatile storage system known in the art, such as a one or more hard disk drives, a Direct Access Storage Device (DASD), Just a Bunch of Disks (JBOD), a Redundant Array of Independent Disks (RAID), tape library, optical library, etc. The server 2 includes a backup server program 10 that is capable of performing backup operations of data objects received from the backup client programs 12a, 12b. The backup client programs 12a, 12b execute on the clients 4a, 4b and include the capability of transmitting objects to backup to the server 4. The clients 4a, 4b are capable of accessing client data 14a, 14b, which includes objects that the clients can transmit to the server 2. Although two clients 4a, 4b are shown, there may be only one or more than two clients 4a, 4b with backup client programs 12a, 12b on the network 6.

When writing backup objects received from the backup client programs 12a, 12b to the backup storage 8, the backup server program 10 would add records into a backup database 14 providing searchable and indexable information on backed-up objects. The backup database 14 may be implemented with any database architecture known in the art, such as a relational database, object oriented database, a table, etc. If the backup objects are associated with a group, then indication of the associated group would be included with the object information in the backup database 14.

Figure 2A:
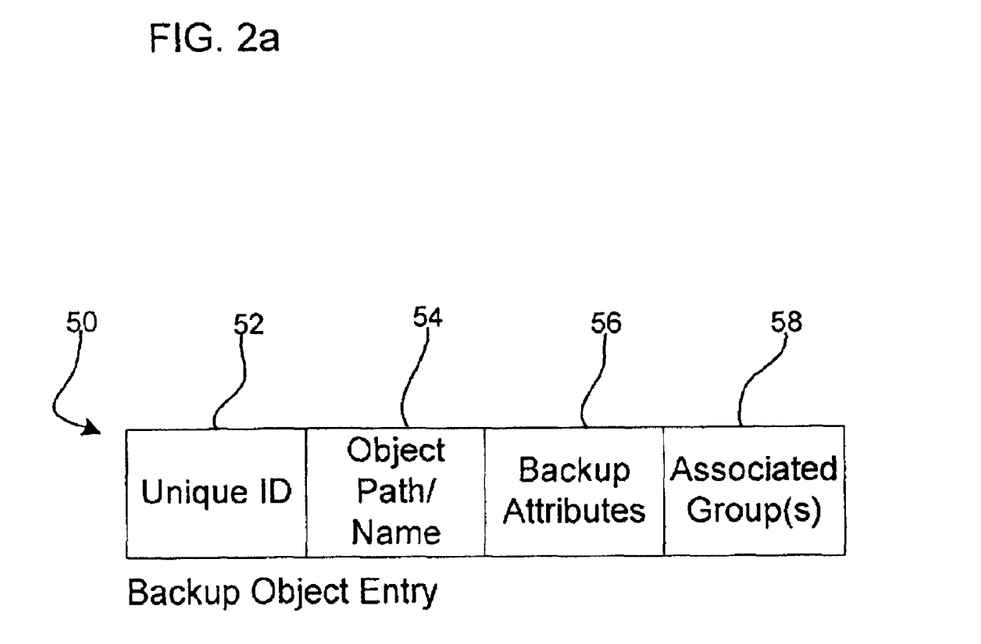
FIGS. 2a and 2b illustrates a data structure for a backup object entry in a backup database in accordance with implementations of the invention.

FIG. 2a illustrates the data structure of a backup object entry 50 or record in the backup database 14 that is added whenever a backup object is confirmed as written to the backup storage 8. The entry 50 includes a unique identifier 52 that uniquely identifies the backup object and entry in the backup database 14. An object path/name field 54 includes the directory path and the file name of the object that was backed up from the client. The object path/name field 54 may include the name of the location of the object in the file directory on the client that submitted the object. The backup attributes 56 provides information on the backup, such as administrator defined backup policies (e.g., attributes that control the generation, destination, and expiration of backup files). The associated groups(s) field 58 indicates one or more groups to which the backup object belongs. The field 58 may specify any number of groups, i.e., zero or more, by listing one or more groups or having a pointer to a data structure indicating multiple groups with which the current object is associated.

Figure 2B:
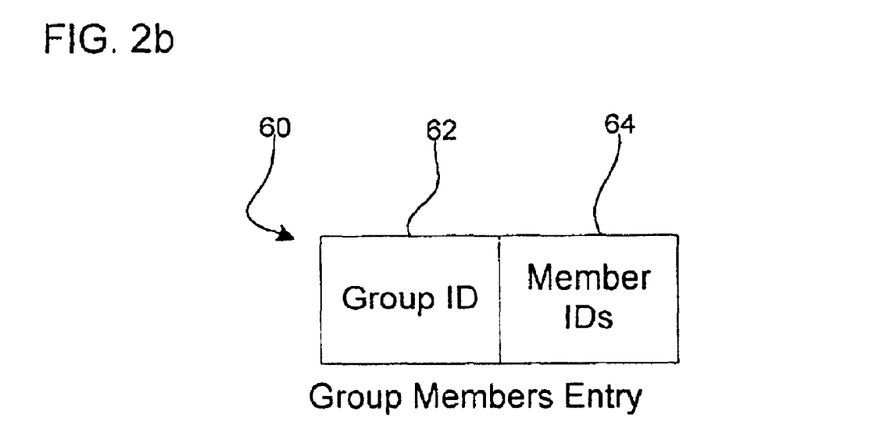

FIG. 2b illustrates a group members entry 60 in a group members table, which may be included in the backup database 14, where each entry includes a group ID 62 and the member IDs 64 of any objects that are members of the group identified in field 62. The group members table may be a table within the backup database 14.

In the described implementations, groups may be defined by the administrator or the backup program when storing related files or objects that together comprise a database. Backup objects may be defined as part of a backup group by adding the group identifier of the one or more groups in which the backup object is a member to the group field 58. Additionally, the member identifier would also be added as an entry to the group members entry for that group to which the member is added. The "group" concept implements an association of related files/objects, which may be part of the same backup operation, and treated as part of a same backup entity. Further, the same file, i.e., drive, path, and file name, may have multiple entries in the backup database 14 for different versions of such file. Such different versions of a file may be associated with different backup groups. Additionally, a backup object may not be associated with any group.

In certain implementations, a group is implemented as an entry 50 in the backup database 14, also referred to as a "group leader", having a unique ID 52 that also functions as the unique group number indicated in the group field 58 of those backup objects that are members of the group. The unique ID 52 further uniquely identifies the group leader entry 50 in the backup database 14. The attributes field 56 for the group leader may be left empty or may indicate policies that apply to all objects in the group and/or the status of the group, e.g., active or inactive. Thus, when the group leader is expired or deleted, all the objects that are members of that group would also be expired or deleted, if they do not also belong to other groups. When a group leader is restored, all objects belonging to that group would also be restored. However, when a group leader is moved, objects that are members of that group would not necessarily be moved, since group members may be stored on different tapes. In this way, all members within a group are managed based on the attributes of the group leader. The group members may inherit their leader attributes or include the leader attributes set in their own individual attribute fields. The object path/name field 54 in the group leader entry 50 may be a name assigned to the group and, in certain implementations, not an actual file path and name because the group entry is used to relate member objects and there may be no file for the group leader. A group leader may be a member of one or more other super groups, i.e., a group of groups. In such case, the unique ID of a super group is indicated in the group field 58 of group leaders within that super group.

A client program 12a, 12b can invoke the following operations. Certain of these operations may also be initiated by internal server operations, such as automatic expiration of backup objects based on a predefined policy. These operations may be invoked by a client program, or by a user through a user interface.

OPEN: creates a new group with a temporary name. For instance, if the user defines a name for a new group, then a temporary tag would be appended to the group file name, e.g., DBGRP_TEMP, where DBGRP is the name of a database     (DBGRP) group. While a group is open, the file name in the group leader entry includes the temporary tag.

CLOSE: After sending all objects to backup, any backup client program 12a, 12b may issue a CLOSE request to commit the group, which will only be committed if all the member objects have also been committed as indicated in the commit field 60. Upon closing a group, the group leader name, included in the object path/name field 54, is renamed to remove the temporary tag, such as from "DBGRP_TEMP" to "DBGRP".

ADD: adds a new object to the group, which involves adding a backup object entry 50 for the object to the backup database 14.

REMOVE: removes an object from a specified group without deleting the object itself. This involves removing the specified group from the list of associated groups 58 in the backup object entry 50 for the specified object and the backup object entry 50 remains in the backup database 14.

ASSIGNTO: Associates an existing backup object or group leader entry 50 with another specified group by adding the unique ID of the specified group leader to the associated groups field 58 of the entry 50. The object entry 50 that is assigned to the additional specified group may represent a backup object or a group leader.

DELETE: removes a specified object entry from the backup database 14. If the specified object is for a group leader, then all group members of that group are also deleted.

Figure 3:
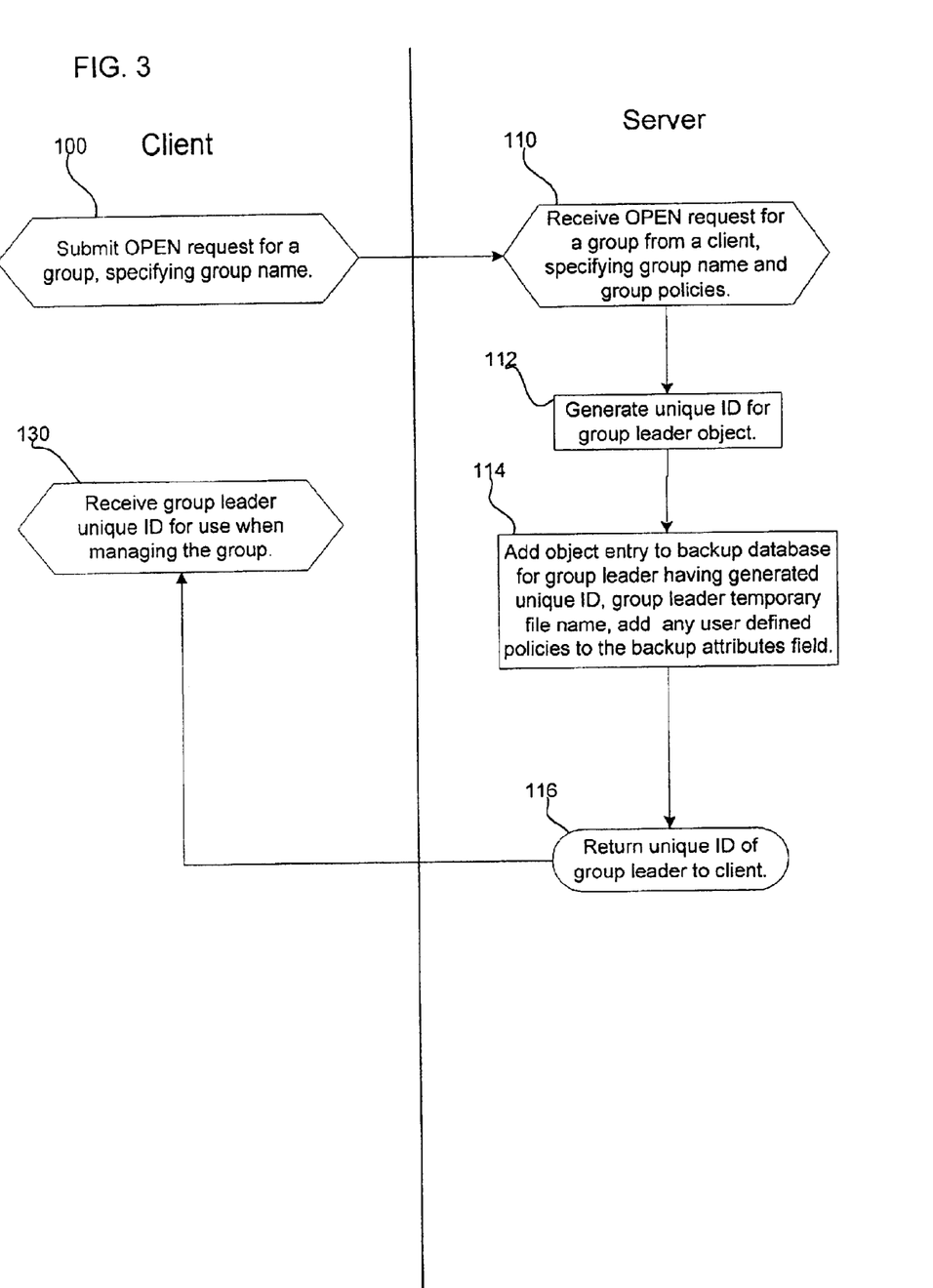
FIGS. 3–8 illustrate logic to manage backup objects in the backup database in accordance with implementations of the invention.

FIGS. 3–8 illustrate computer operations performed by the backup client program 12a, 12b and the backup server program 10 to perform the above described backup operations. FIG. 3 illustrates logic to open a new group to which the backup client programs 12a, 12b can add backup objects. At block 100, the backup client program 12a, 12b submits an OPEN request with the name of the backup group to open. The subject backup group name may be for a new backup group or for a new version of an already existing backup group. In response to receiving the OPEN request, the backup server program 10 performs the operations at block 112–116. At block 112, the backup server program 10 generates a unique object identifier (ID) for the backup group to open. The backup server program 10 then adds (at block 114) an entry 50 to the backup database 14 for the group, and adds the generated unique ID to field 52 (FIG. 2a), a group leader temporary file name to the object path/name field 54, and user defined policies for the group to the backup attributes field 56. For instance, if the specified group name to open is DBGR, then the temporary name might be "DBGR_TEMP", where the temporary tag is used to identify a group as in the open state and available to receive new backup objects. The unique object ID for the group is then returned (at block 116) to the backup client program 12a, 12b that initiated the OPEN request. The backup client program 12a, 12b would then use (at block 130) the received unique ID for the group leader group object ID when requesting actions with respect to that group.

Once a group is opened, a backup client program 12a, 12b may perform the ADD, REMOVE, ASSIGNTO, DELETE, and CLOSE operations with respect to the group. The backup client program 12a, 12b that opened the group would receive the group object ID after the backup server program 10 completes OPEN process. Other backup client programs 12a, 12b could obtain the group object identifier by querying the backup server program 10 for all open groups. The backup server program 10 may implement this query by searching for all object path/name fields 54 having names with the temporary tag and return a list of all such open groups to the backup client program 12a, 12b. In this way, backup objects may be added, deleted, removed in the manner described below by one or more clients 4a, 4b.

Figure 4:
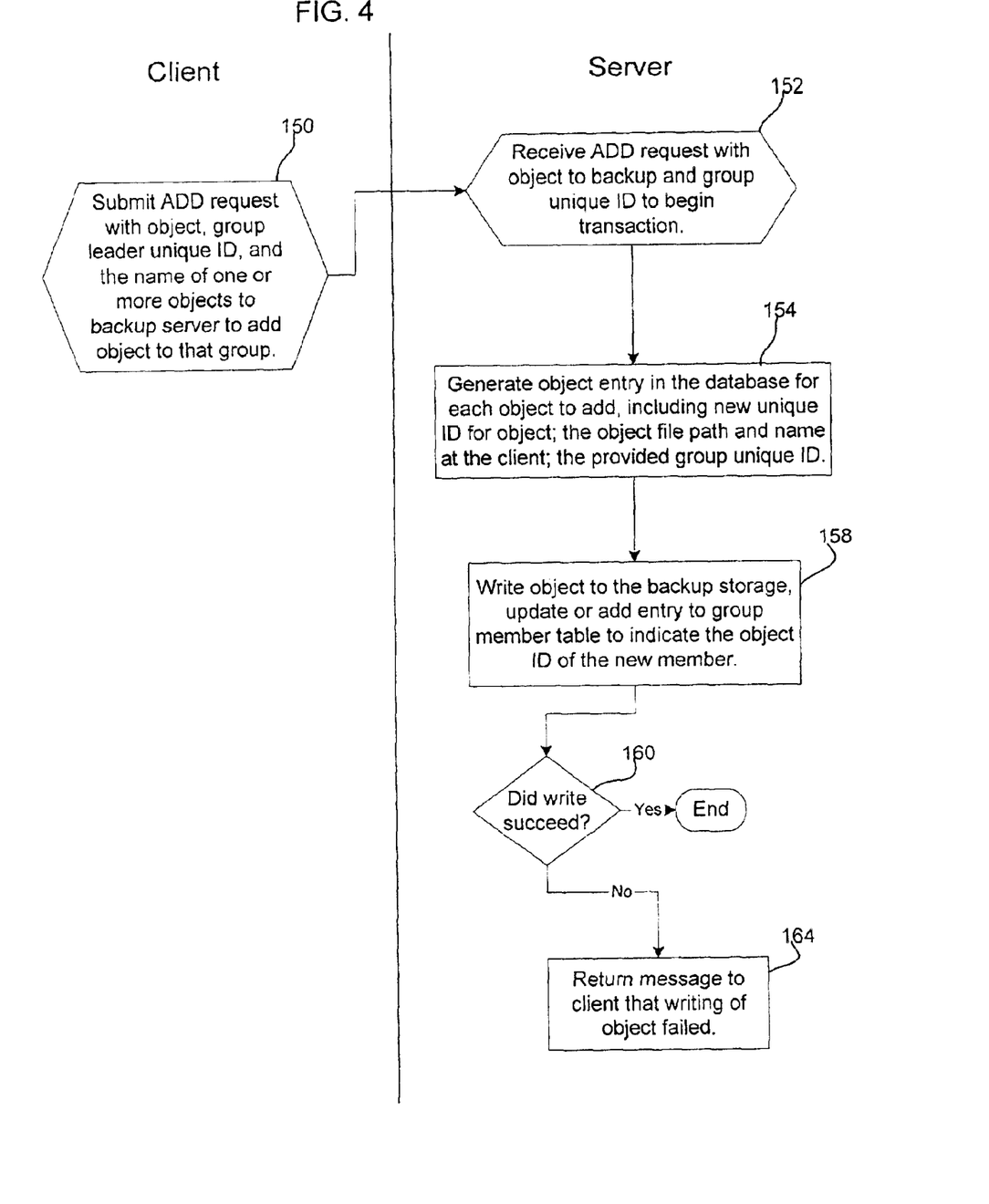

FIG. 4 illustrates logic for backup clients programs 12a, 12b to add backup objects, e.g., files, etc., to a backup group opened in the backup database 14. Control begins at block 150 with the backup client program 12a, 12b submitting the ADD request with one or more backup objects to add to a specific group, and the file name of the one or more backup objects to the backup server program 10. The group may be identified by the unique group object ID or the name of the group. Any operation described herein, such as the ADD, REMOVE, ASSIGNTO, etc., may be performed with respect to a closed or opened group. In response to receiving the ADD request, the backup server program 10 performs the steps at block 154 to 164 if the group identified in the request is opened, i.e., the entry in the backup database 14 for the group object ID has a temporary filename or one entry in the backup database having the specified group leader file name includes the temporary indicator. At block 154, the backup server program 10 generates a backup object entry 50 (FIG. 2a) into a transaction log for each object included with the ADD operation, and, for each object being added, adds a new unique object identifier (ID) for the backup object to field 52, the object file path and name at the client data 14a, 14b in the object path/name field 54, any supplied backup attributes in field 56, and the provided group unique object identifier (ID) in field 58. The backup server program 10 then writes (at block 158) the received backup object to the backup storage 8. If (at block 160) the write is not successful, then a message is returned (at block 164) to the client 4a, 4b initiating the ADD request that the backup object was not successfully added to the backup storage 8. In certain implementations, data may first be written to a transaction log. When data in the log for a transaction is fully transferred to the backup storage 8, then the data for the transaction is committed. If any part of writing the data fails, then the update is rolled-back by undoing the update in the transaction log before the data is applied to the backup storage 8.

The ADD operation may be used to backup a single object or add multiple objects with a single ADD request. However, if an ADD is used to backup multiple objects, then failure to backup one of the objects in the ADD may fail the entire ADD transaction. The backup client program 12a, 12b may resubmit the failed backup object to retry the backup for that object while the group remains open, i.e., has the temporary file name.

Figure 5:
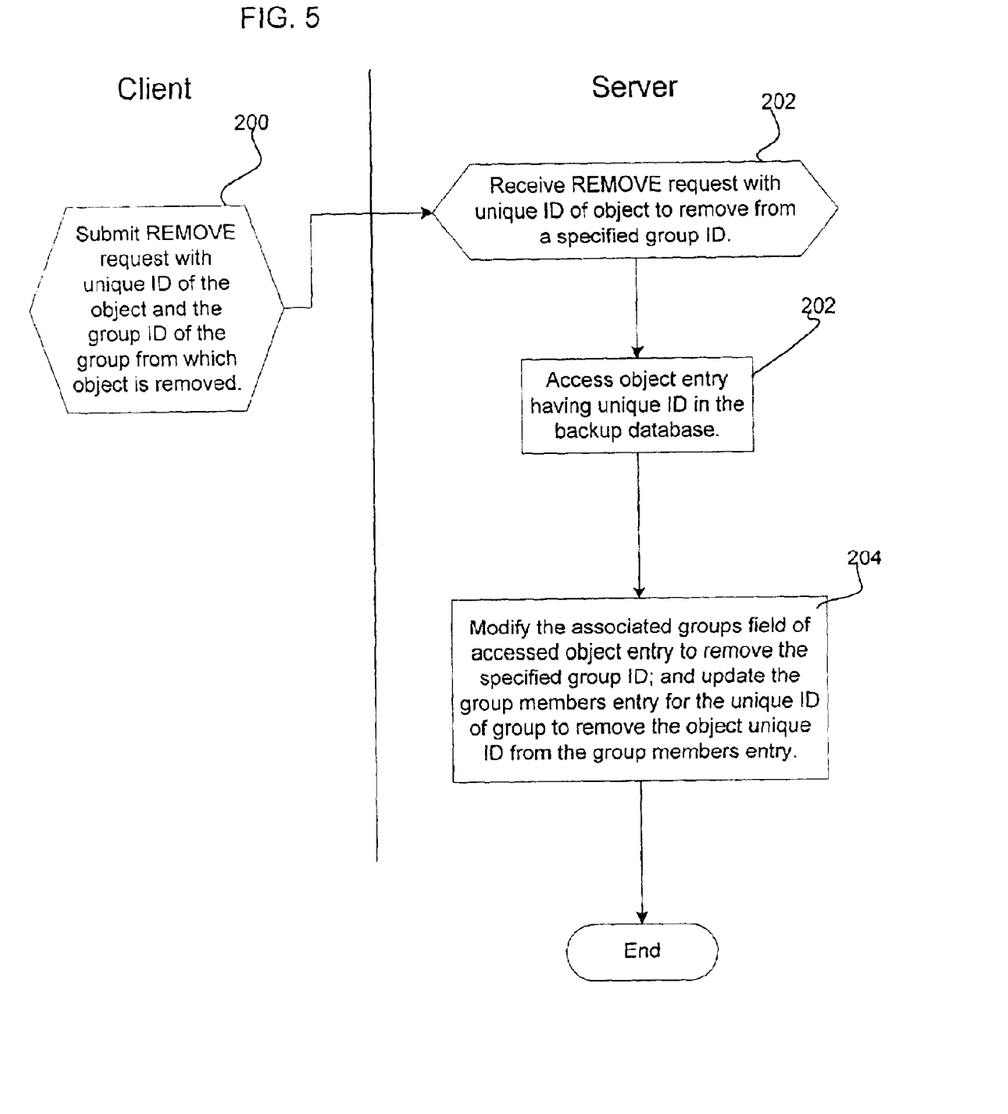

FIG. 5 illustrates logic to remove a backup object from a group in the backup database 14 so that particular backup object will no longer be part of the specified backup group. At block 200, the backup client program 12a, 12b submits a REMOVE request to the backup server program 10 including the name or unique object identifier of the backup object and the group from which the backup object will be removed. The group leader may be identified by the unique object identifier or name of the group leader. In response, the backup server program 10 performs the operations at blocks 202–204. At block 202, the backup server program 10 accesses the requested backup object, having the specified unique object ID or object name. The accessed object entry 50 is modified (at block 204) to remove the specified group object ID from the assigned groups field 58 of the accessed entry. Further, the group members entry 60 for the group from which the object will be removed is updated to remove the unique object identifier of the backup object indicated in the REMOVE request from the member IDs field 64. If the client backup program 12a, 12b only provided the name of the backup object, then the backup server program 10 would query the backup database 14 to locate the entry having the specified object file name in the object path/name field 54 that also has the specified group object ID in the associated groups field 58.

Figure 6:
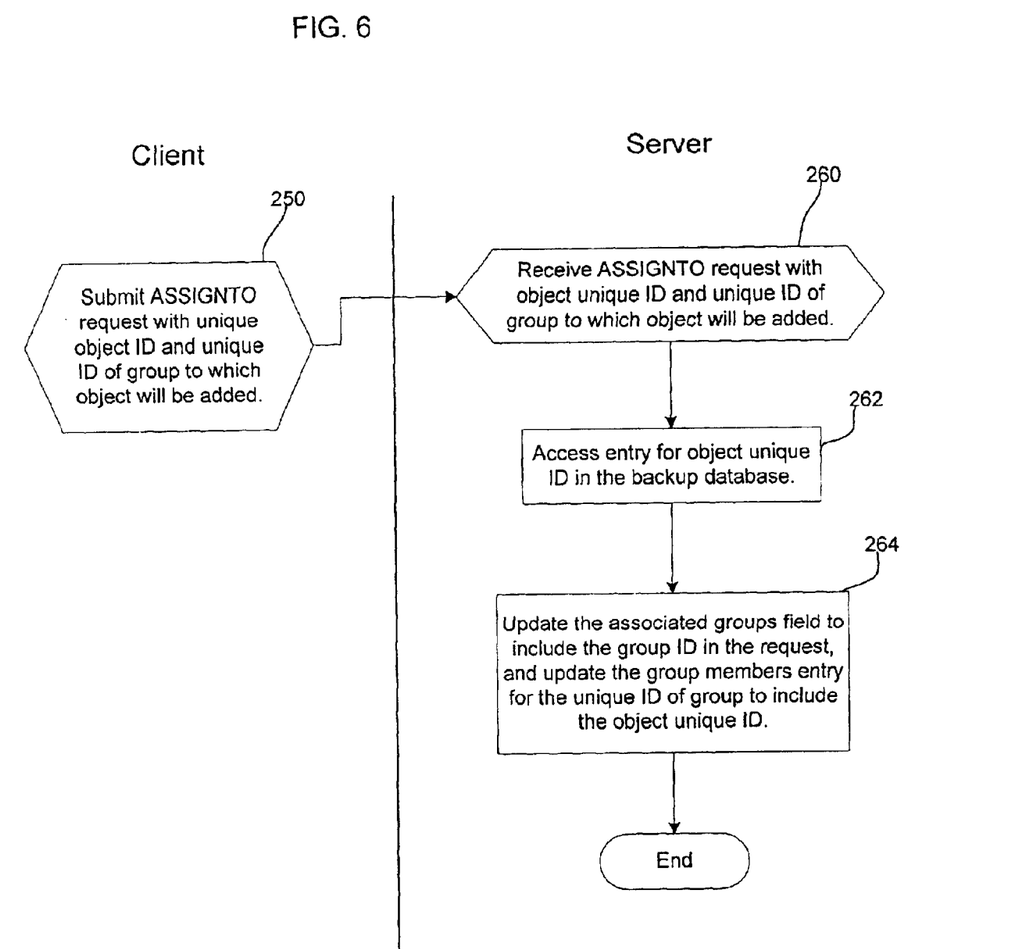

FIG. 6 illustrates logic to assign an already existing object entry to a group without having to retransmit the backup object to the backup server program 10. At block 250, the backup client program 12*a*, 12*b* submits the ASSIGNTO request with the unique object identifier of a group and the unique object identifier of the backup object to add to the specified group. In response (at block 260) to receiving the ASSIGNTO request, the backup server program 10 accesses (at block 262) the entry 50 in the backup database 14 of the backup object having the specified unique object identifier. The associated groups field 58 for the accessed entry 50 is then updated (at block 264) to include the group unique object ID specified in the ASSIGNTO request so that the backup object is now part of that group. Further the group members entry 60 for the specified group is updated to include the unique object identifier of the backup object indicated in the ASSIGNTO request in the member IDs field 64.

Figure 7:
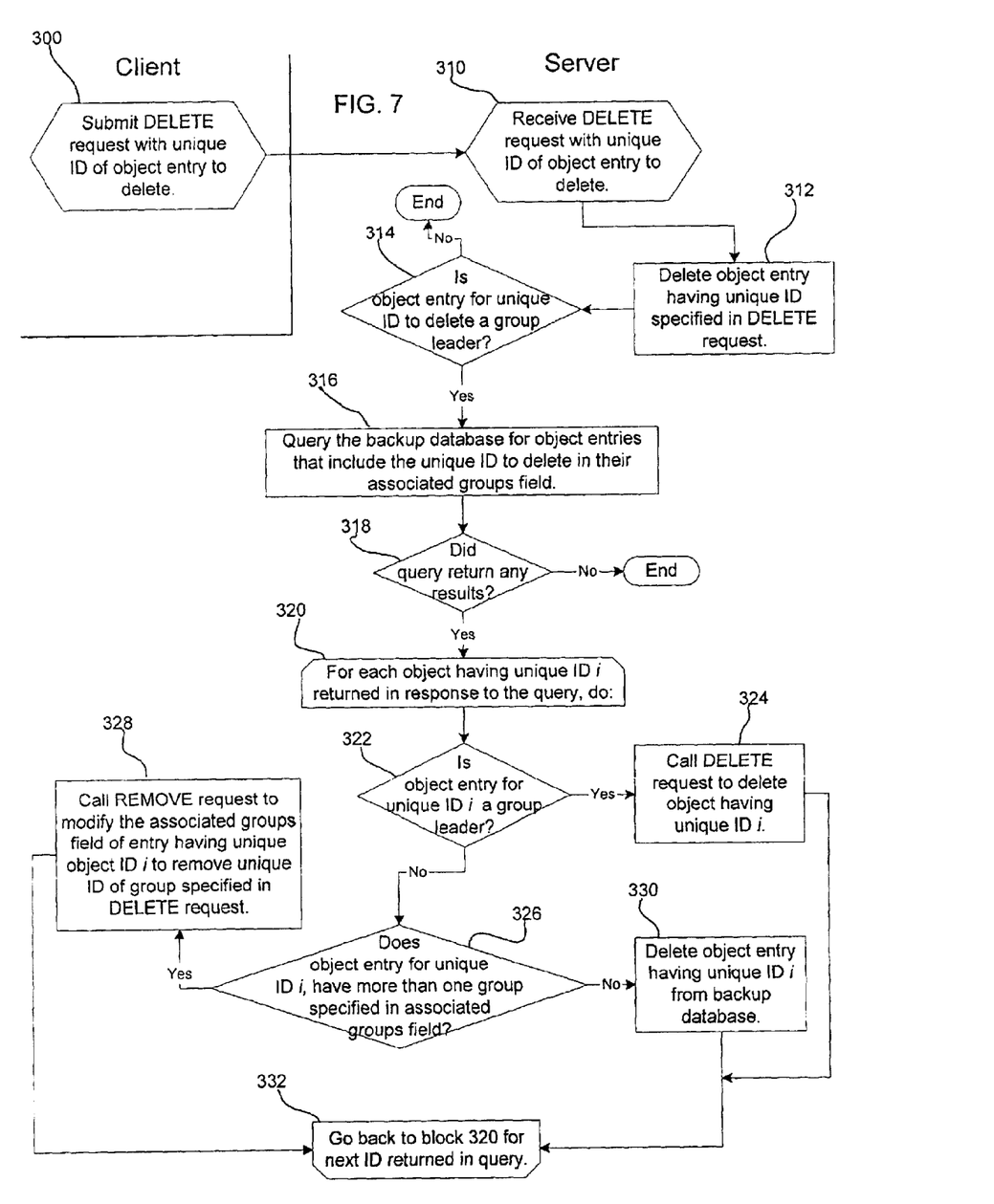

FIG. 7 illustrates logic to delete an object entry, which may represent a backup object or group leader, from the backup database 14 so that object is no longer part of the backup database 14. Control begins at block 300 where the backup client program 12*a*, 12*b* or file management operations initiated at the server, e.g., to expire certain files, filespace/volume deletion, etc., submits a DELETE request with the unique object identifier (ID) of the object entry 50 to delete, which may comprise a backup object or group leader. The object entry having the unique ID specified in the DELETE request is deleted (at block 312) from the backup database 14. If (at block 314) the object to delete is not a group leader, then control ends. Otherwise, if the object to delete is a group leader, then the backup server program 10 uses the group members entry 60 (at block 316) to determine object entries in the backup database 14 that include the object identifier (ID) specified in the DELETE request in their associated groups field 58, i.e., backup objects or group leaders that are members of the group to delete. If (at block 318) the query returns entries of members of the group to delete, then the requested object to delete is a group. In such case, the backup server program 10 performs a loop at blocks 320–332 for each object identifier (ID) returned by the query. If (at block 322) the object entry having the unique ID i is a group leader, then the DELETE request is called (at block 324) to recursively perform the steps of the DELETE request to delete that group. After recursively performing a DELETE of a group at block 324, control returns to the location from where the recursive call to the DELETE was made and proceeds to block 332 to process the next unique ID i returned from the query.

If (at block 322) the entry having the unique ID i is not a group leader, then if (at block 326) the object having the unique ID i is associated with more than one group, as indicated in the associated groups field 58, then the REMOVE request is called (at block 328) to modify the associated groups field 58 of the entry having unique object ID i to remove the unique ID of the group specified in the DELETE request from the groups field 58. Thus, if an object is associated with multiple groups, the object entry is not deleted so that the object entry remains available for associated groups other than the group being deleted. If (at block 326) the object entry having the unique ID i is only a member of one group, then that object entry having unique ID i is deleted (at block 330) from the backup database 14. From blocks 328 and 330, control proceeds to block 332 to process the next unique ID i. The logic of FIG. 7 ensures that when deleting a group, any backup objects in the group or further groups nested in the group to delete and their backup objects are also deleted. In alternative implementations, the group members table may be used to determine IDs of members associated with the group being deleted so that these members can also be considered for deletion. Further, after deleting the object entry, if the object entry is a group, then the group members table would be updated to remove the entry for any deleted group leader object.

Figure 8:
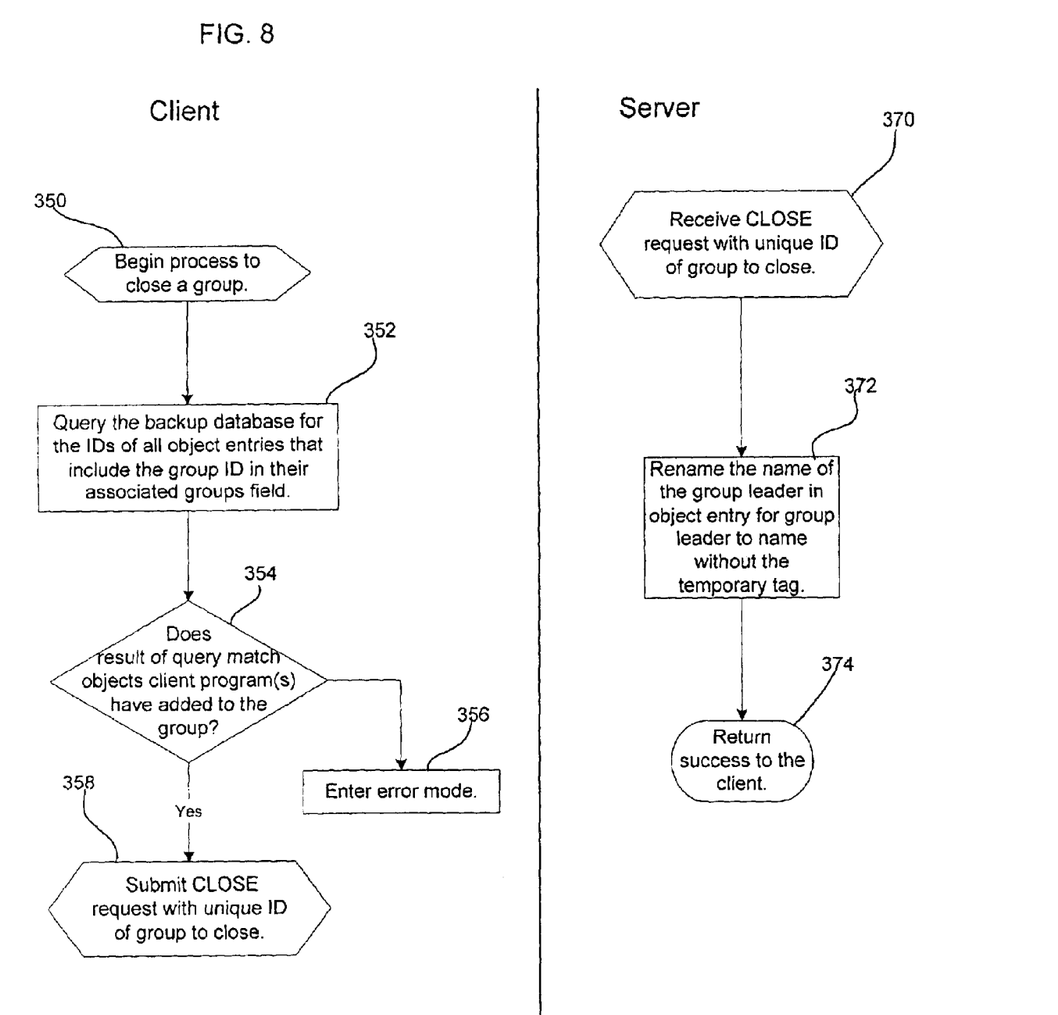

FIG. 8 illustrates logic for the CLOSE request to make the closed group the active version of the backup, and make the previous active version inactive. An active group is the most recently closed version of a group. Until a close is issued, the previous version of the named group is not marked inactive, which allows for a roll-back without loss of data. Further, even after the close, the operations described herein may be used to remove and assign objects to the closed group. At block 350, the backup client program 12*a*, 12*b* begins the process to close a group by querying (at block 352) the backup database 14 for the object identifiers (IDs) of all object entries 50 that include the specified group object ID to close in their associated groups field 58, i.e., all backup objects or group leaders that are members of the group to close. If (at block 354) the objects returned in the query match the objects the backup client programs 12*a*, 12*b* have added to the open group, then all objects sent to the open group have been successfully committed to the backup database 14. If the objects returned in the query are less than the object the backup client programs 12*a*, 12*b* added, then error mode is entered (at block 356). Error mode may involve having the backup client programs 12*a*, 12*b* resubmit the backup objects through an ADD request, or issue a DELETE request to delete the open group, and all member objects, and roll back to the previous version of the group. In error mode, a message may be sent to the backup client programs 12*a*, 12*b* that initiated the CLOSE request that the CLOSE request failed. If the result of the query match what the client backup program 12*a*, 12 backed-up, then the backup client program 12*a*, 12*b* issues (at block 358) a CLOSE request. In response (at block 370) to the close request, the server renames (at block 372) the name in the object path/name field 54 in the entry 50 for the group being closed to the name without the temporary tag and returns (at block 374) success to the client initiating the CLOSE request. If the group name is provided, then the backup server program 10 would have to locate the entry that includes the provided group name with the temporary tag, indicating that the entry is for an open group.

In certain described implementations, any client 4*a*, 4*b* may submit the above described requests to associate backup objects with one or more groups and remove and add backup objects to a backup group that is in the "Open" state, thereby allowing modifications to a backup object and group prior to issuance of the CLOSE request. Different versions of a backup object or group may have the same name in the object path/name field 54, but have different unique object identifiers to distinguish an entry between versions.

Following is an example of how the above discussed requests may be used to create groups of backup objects in the backup database 14. The backup client program 12*a*, 12*b* would submit an OPEN request with a group name, e.g., DBGRP, to create a new group. In response, the backup server program 10 would create an entry in the backup database 14 for the group DBGRP having a file name with the temporary tag and assign a unique identifier to that entry. The backup client program 12*a*, 12*b* would then submit one ADD request for each backup object A, B, C, D, where the ADD request specifies with the unique group ID assigned to the group with backup objects A, B, C, D. In response, the backup server program 10 would store the backup objects in the backup storage 8 and create entries for the backup objects A, B, C, D in the backup database 14 that are associated with the unique group ID. Upon one backup client program 12a, 12b submitting the close request, the backup server program 10 would remove the temporary tag from the file name for the DBGRP group in the group entry.

Subsequently, one backup client program 12a, 12b may open another instance of the DBGRP group. In response, the backup server program 10 would create a new entry with the DBGRP file name having the temporary tag and assign a new unique ID for the new instance of the DBGRP group. The clients 12a, 12b may then issue ADD requests to add modified versions of the A, B, C, and/or D objects associated with the unique ID of the new DBGRP. Further, if the clients 12a, 12b want to associate one of the objects associated with the earlier version of the DBGRP group, then the backup client programs 12a, 12b would submit the ASSIGNTO requests to add the unique ID of the new DBGRP to the associated groups field 58 of the objects A, B, C and/or D associated with a previous version of the DBGRP and already stored in the backup storage 8. In this way, a backup object already stored in the backup storage 8 and represented in the backup database 14 is added to a new group without having to actually retransmit the data over the network 6, thereby conserving network bandwidth. Successfully closing the new group, will deactivate the previously created DBGRP and make the new DBGRP the current active version of the DBGRP group. If there is a failure of the close of the new DBGRP, then the backup server program 10 would delete all the entries for the group having the temporary name and all associated backup objects, leaving the previous version of the DBGRP as the active group.

With the described implementations, removing the temporary tag from the file name finalizes closing of the group.

Following is an example of how an incremental group may be created that only includes data for objects modified since the closing of the previous version of the group. When initially creating the group DBGRP1 on day one, the backup client program 12a, 12b would add objects A, B, and C to the group and close the DBGRP group1. After day one, in the backup database 14, the objects would be identified as follows:

leader DBGRP1 has ID 1
object A has ID 2 and belongs to group ID 1;
object B has ID 3 and belongs to group ID 1;
object C has ID 4 and belongs to group ID 1.

On day two, the backup client program 12a, 12b would want to modify object C' and add object D. To accomplish this, the backup client program 12a, 12b would submit an OPEN request to create a new version of the DBGRP1 group, having the temporary name, which would cause a new group ID to be assigned to the new open version of DBGRP1. The backup client program 12a, 12b would then send one ADD request to send the new version of C' and another ADD request for the new object D to add entries for these objects in the backup database 14 associated with the new version of DBGRP1, having the temporary name. The backup client program 12a, 12b would further use the ASSIGNTO request to associate the unchanged objects A and B with the new version of DBGRP1. In this way, the new group includes unchanged objects without the clients 4a, 4b having to resend the unchanged data, thereby conserving network resources. The DBGRP1 with ID 1 is marked inactive after the new group DBGRP1 with ID 5 is committed because the closed DBGRP1 with ID5 is now the active version. Below is the state of the backup database 14 with respect to the new version of DBGRP1 after day two:

leader DBGRP1 (inactive) ID 1;
leader DBGRP1 (active) ID 5;
object A has ID 2 and belongs to group ID 1 and group ID 5;
object B has ID 3 and belongs to group ID 1 and group ID 5;
object C has ID 4 and belongs to group ID 1;
object C' (the modified C) has ID 6 and belongs to group ID 5;
object D has ID 7 and belongs to group ID 5;

The described implementations provide techniques to create backup groups such that open backup groups may continue to receive new objects across transactions until the group is closed. This allows backup objects to be added or removed from a backup group in separate transactions while the group remains in the open state. Further, any backup object in the database can be associated with multiple groups, thereby avoiding the need to resend objects to include in a group that are already stored in the backup storage 8 and have entries in the backup database 14. Still further, with certain implementations, multiple clients may add objects to a single backup group. Further, in certain implementations, backup objects may be removed from a group after the group has been committed and different versions of a group may have different members.

Further, with the described implementations, a query can be made of all members associated with an open group by querying for the unique identifier of the entry having the group name with the temporary tag and then querying for those entries that include the determined unique identifier in the associated groups field 58. Alternatively, to determine all members of a group, the group member table can be queried, where each entry 60 (FIG. 2b) in the group member table lists the members 64 of each group 62.

To restore a group, the group members table may be queried to find all group members, and then a request would be issued to restore all members from that group. The backup client programs 12a, 12b restore from an open or closed group. Because the objects in an open group and closed group are committed in the backup database 14, the restore may be performed from the objects in the open group or from a previous version.

Thus, the described implementations provide techniques for grouping objects, such as backup objects stored in backup storage and managed in a backup database. For instance, in certain implementations, groups can be nested so a group leader can be a member of another group and a group member can belong to multiple groups. Further, a group may remain open until a close request is issued and the open group may have a temporary name and is not part of the normal naming scheme on the server database. In yet further implementations, although the open group has all the properties of a closed group, the server can access all members through the leader and all group operations are valid on an open group. Still further, in certain implementations, the backup client program can differentiate between an open group and a closed one. The client may submit queries to discover the following information: all groups (open or closed); all members of a particular group; all members of a group of the same object type. Further, in certain of the implementations, objects can be added to or deleted from a group over time to maintain the relationship between members thereby capturing the most recent state without having to re-send all members again. Yet further, an open group may not version off a closed group of the same name until it is closed.

Additional Implementation Details

The described backup logic may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable media, such as magnetic storage media (e.g., hard disk drives, floppy disks,, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.) Code in the computer readable media is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing media known in the art.

In the described implementations, the backup program was maintained in a server that provided access for multiple clients to a file system in the server. In alternative implementations, the backup program may be used to backup files on a standalone system that is not within a client/server environment. In such case, the operations described as performed by the backup client and server programs would be performed on a same system.

In described implementations, updates were first written to a transaction log before being applied to the backup database. In alternative implementations, a transaction log may not be used, and data may be committed to the backup database and "undone" using techniques known in the art that do not use a transaction log.

Figure 9:
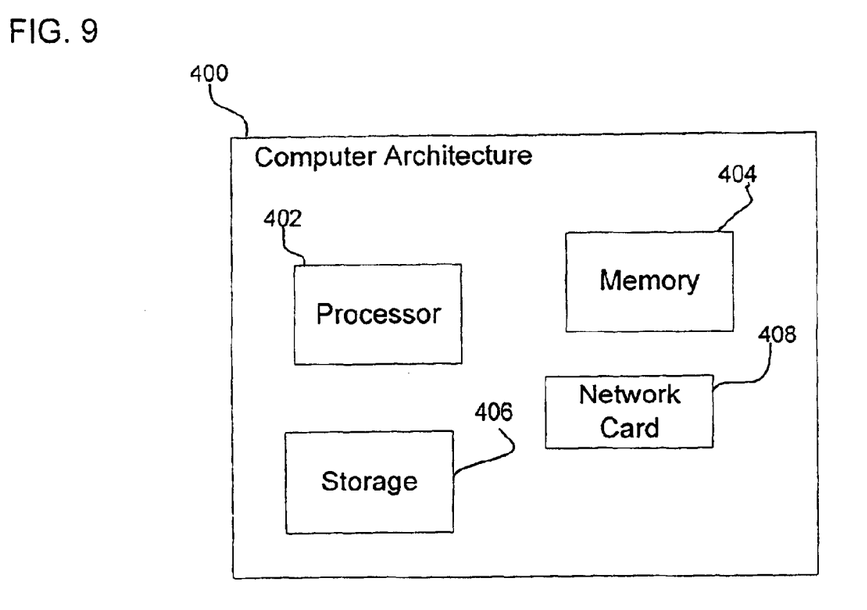
FIG. 9 illustrates further details of the computing environment of FIG. 1 in accordance with certain implementations of the invention.

FIG. 9 illustrates one implementation of the architecture of the server 2 and clients 4a and 4b. These systems 2, 4a, and 4b may implement a computer architecture 400 having a processor 402 (e.g., a microprocessor), a memory 404 (e.g., a volatile memory device), and storage 406 (e.g., a non-volatile storage, such as magnetic disk drives, optical disk drives, a tape drive, etc.). The storage 406 may comprise an internal storage device or an attached or network accessible storage. Programs in the storage 406 are loaded into the memory 404 and executed by the processor 402 in a manner known in the art. The architecture further includes a network card 408 to enable communication with a network.

In described implementations, the temporary tag to indicate that a group leader entry is in the open state comprises a temporary indicator added to the group name. Alternatively, the temporary tag may comprise any transformation or alteration of a group name that is used to indicate that the group leader entry is in an open state. Still further, the group leader entry name may not be modified and, instead, information may be added to a field in the group leader entry indicating that the group leader is in the open state versus the closed state.

FIGS. 2a and 2b illustrate a particular arrangement of a backup object entry and group members entry. In alternative implementations, the backup object entry and group members entry may include additional information fields, fewer information fields or a different arrangement of the information into the fields.

The flowcharts of FIGS. 3–8 described specific operations occurring in a particular order. However, those skilled in the art will appreciate that the logic described with respect to the flowcharts may be modified in that steps may be added, consolidated or modified. Further, operations described as being performed sequentially may, in certain instances, be performed in parallel. Yet further, the operations described may be performed by a single processor or distributed across multiple processors.

Therefore, the foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for grouping backup objects stored in backup storage, comprising:

creating a backup group;

adding a plurality of backup objects that originate from different backup clients as members of the backup group in separate backup transactions by adding an entry to a database for each backup object, wherein the entry indicates the backup object and the backup group in which the backup object is a member; and storing backup objects added to the backup group to the backup storage.

2. The method of claim 1, further comprising:

receiving the backup object when the backup object is added to the backup group to store in the backup storage.

3. The method of claim 1, further comprising:

creating a plurality of backup groups; and adding backup objects to the plurality of backup groups, wherein at least one backup object is added to the plurality of backup groups.

4. The method of claim 1, wherein creating the backup group further comprises:

including a temporary tag in a name for the created backup group;

receiving a request to close the created backup group; and renaming the created backup group to remove the temporary tag from the name in response to the close request.

5. A method for grouping backup objects stored in backup storage, comprising:

creating a backup group;

adding backup objects to a first backup group by adding an entry to a database for each backup object, wherein the entry indicates the backup object and the first backup group in which the backup object is a member;

adding one backup object to a second backup group that was previously added to the first backup group by updating the entry of the backup object to indicate the second backup group; and storing the backup objects in the backup storage when adding the backup objects to the first backup group, wherein the backup object is not stored in the backup storage when adding the backup object to the second backup group.

6. The method of claim 5, wherein one entry is included in the database for each backup object and backup group providing an identifier of the backup object or backup group represented by the entry, wherein the backup object entries indicate the identifier of the backup group of which the backup object is a member.

7. The method of claim 6, further comprising:

receiving a request to remove one specified backup object from one specified backup group; and updating the entry for the specified backup object to remove the indication of the specified backup group in response to the remove request.

8. The method of claim 6, further comprising:

receiving a request to delete one specified backup object; and indicating the specified backup object as deleted from the database in response to the delete request.

9. The method of claim 7, further comprising:

receiving a request to delete one specified backup group; and indicating that backup objects that are members of the specified backup group are not members of the specified backup group in response to the delete request.

10. The method of claim 9, wherein indicating that the backup objects that are members of the specified backup group are not members of the specified backup group further comprises:

indicating the backup objects that are members of the specified backup group as deleted if the backup objects are not members of any backup group other than the specified backup group; and updating the entry of backup objects that are members of the specified backup group to remove the indication of the specified backup group if the backup objects are members of at least one backup group other than the specified backup group.

11. The method of claim 5, further comprising:

adding the first backup group to the second backup group, wherein all the backup objects that are members of the first backup group are members of the second backup group.

12. A system for grouping backup objects stored in backup storage, comprising:

means for creating a backup group;

means for adding a plurality of backup objects that originate from different backup clients as members of the backup group in separate backup transactions by adding an entry to a database for each backup object, wherein the entry identifies the backup object and the backup group in which the backup object is a member; and means for storing backup objects added to the backup group to the backup storage.

13. The system of claim 12, further comprising:

means for creating a plurality of backup groups; and means for adding backup objects to the plurality of backup groups, wherein at least one backup object is added to the plurality of backup groups.

14. The system of claim 12, wherein the means for creating the backup group further performs:

including a temporary tag in a name for the created backup group;

receiving a request to close the created backup group; and renaming the created backup group to remove the temporary tag from the name in response to the close request.

15. A system for grouping backup objects stored in backup storage, comprising:

means for creating a plurality of backup groups;

means for adding backup objects to a first backup group by adding an entry to a database for each backup object, wherein the entry indicates the backup object and the first backup group in which the backup object is a member;

means for adding one backup object to a second backup group that was previously added to the first backup group by updating the entry of the backup object to indicate the second backup group; and means for storing the backup objects in the backup storage when adding the backup objects to the first backup group, wherein the backup object is not stored in the backup storage when adding the backup object to the second backup group.

16. The system of claim 15, wherein one entry is included in the database for each backup object and backup group providing an identifier of the backup object or backup group represented by the entry, wherein the backup object entries indicate the identifier of the backup group of which the backup object is a member.

17. An article of manufacture for grouping backup objects stored in backup storage, wherein the article of manufacture is capable of causing operations to be performed, the operations comprising:

creating a backup group;

adding a plurality of backup objects that originate from different backup clients as members of the backup group in separate backup transactions by adding an entry to a database for each backup object, wherein the entry identifies the backup object and the backup group in which the backup object is a member; and storing backup objects added to the backup group to the backup storage.

18. The article of manufacture of claim 17, further comprising:

receiving the backup object when the backup object is added to the backup group to store in the backup storage.

19. The article of manufacture of claim 17, further comprising:

creating a plurality of backup groups; and adding backup objects to the plurality of backup groups, wherein at least one backup object is added to the plurality of backup groups.

20. The article of manufacture of claim 17, wherein creating the backup group further comprises:

including a temporary tag in a name for the created backup group;

receiving a request to close the created backup group; and renaming the created backup group to remove the temporary tag from the name in response to the close request.

21. An article of manufacture for grouping backup objects stored in backup storage, wherein the article of manufacture is capable of causing operations to be performed, the operations comprising:

creating a plurality of backup groups;

adding backup objects to a first backup group by adding an entry to a database for each backup object, wherein the entry indicates the backup object and the first backup group in which the backup object is a member;

adding one backup object to a second backup group that was previously added to the first backup group by updating the entry of the backup object to indicate the second backup group; and storing the backup objects in the backup storage when adding the backup objects to the first backup group, wherein the backup object is not stored in the backup storage when adding the backup object to the second backup group.

22. The article of manufacture of claim 21, wherein one entry is included in the database for each backup object and backup group providing an identifier of the backup object or backup group represented by the entry, wherein the backup object entries indicate the identifier of the backup group of which the backup object is a member.

23. The article of manufacture of claim further comprising:

receiving a request to remove one specified backup object from one specified backup group; and updating the entry for the specified backup object to remove the indication of the specified backup group in response to the remove request.

24. The article of manufacture of claim 23, further comprising:

receiving a request to delete one specified backup object; and indicating the specified backup object as deleted from the database in response to the delete request.

25. The article of manufacture of claim 22, further comprising:

receiving a request to delete one specified backup group; and indicating that backup objects that are members of the specified backup group are not members of the specified backup group in response to the delete request.

26. The article of manufacture of claim 25, wherein indicating that the backup objects that are members of the specified backup group are not members of the specified backup group further comprises:

indicating the backup objects that are members of the specified backup group as deleted if the backup objects are not members of any backup group other than the specified backup group; and updating the entry of backup objects that are members of the specified backup group to remove the indication of the specified backup group if the backup objects are members of at least one backup group other than the specified backup group.

27. The article of manufacture of claim 21, further comprising:

adding the first backup group to the second backup group, wherein all the backup objects that are members of the first backup group are members of the second backup group.

* * * * *